Jan. 6, 1959 W. ERNST 2,867,117
TORQUE MEASURING AND REGULATING DEVICE
Filed July 23, 1956
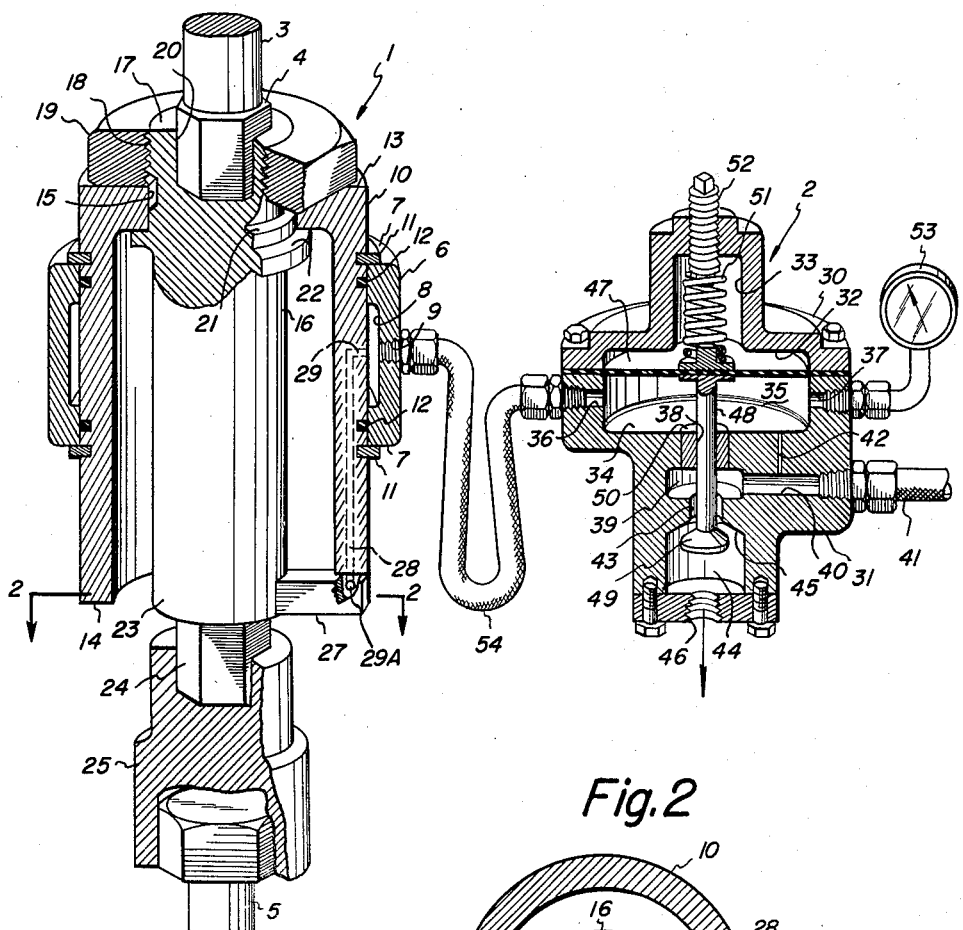
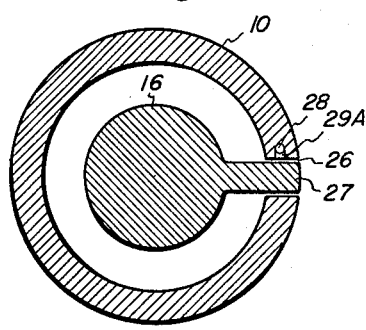
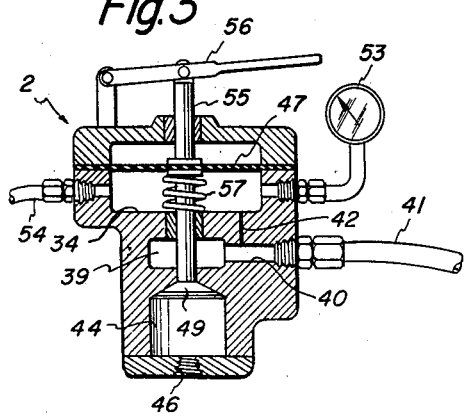
INVENTOR.
WALTER ERNST
BY Toulmin & Toulmin
Attorneys

2,867,117

TORQUE MEASURING AND REGULATING DEVICE

Walter Ernst, Dayton, Ohio, assignor to The Commonwealth Engineering Company of Ohio, Dayton, Ohio Application July 23, 1956, Serial No. 599,605

6 Claims. (Cl. 73—139)

The present invention relates to a torque indicating and measuring device, more particularly to a torque controller actuated by the fluid pressure utilized to operate a torsion device, such as an impact wrench or the like whose torque output is to be regulated.

It is the principal object of this invention to provide an improved torque responsive indicating and controlling device.

It is another object of this invention to provide a torque controlling device for use with torsion devices and operable by the fluid pressure which actuates the torsion device.

It is a further object of this invention to provide a torque controlling device which may be pre-set to stop operation of a torsion device when a pre-determined torque is attained.

It is an additional object of this invention to provide a torque control device which continually indicates the torque being transmitted therethrough.

Other objects and advantages of this invention will become apparent upon reference to the accompanying description when taken in conjunction with the following drawings wherein:

Figure 1 is an overall perspective view of the torque control device of this invention with portions of each component being cut away to indicate the interior details of construction;

Figure 2 is a sectional view taken along the lines 2—2 of Figure 1; and

Figure 3 is an elevational view of a modification of the controller illustrated in Figure 1 with portions thereof being cut away to show the interior details of construction.

Returning now to the drawings and more particularly to Figure 1, wherein like reference numerals indicate the same parts throughout the various views, the torque control device of this invention comprises a torque controller 1 and a regulator 2. Each of these components will be described in detail.

The torque controller transmits torque from a torsion device, such as an impact wrench, having an outward shaft 3 having a hex head 4 to an object such as a bolt 5.

The torque controller comprises a first member 6 which is annular in shape and whose outer edges are turned inwardly at 7 to form an internal controller chamber 8 having an opening 9.

A sleeve or second member 10 is rotatably mounted within the first member 6 and is properly positioned with respect thereto by rings 11. Gaskets 12 form a seal between the first and second members.

The second member has a closed end 13 and an open end 14. The closed end 13 has a centrally-located aperture 15 therethrough within which is mounted a torque shaft 16. One end 17 of the torque shaft extends outwardly of the second member 10 and has external threads 18 thereon. A unt 19 is threaded upon the torque shaft threads 18 to position the torque shaft with respect to the second member. There is an axial bore 20 in the end 17 of the torque shaft which bore has a hex shape to accommodate the hex shape bore of the output shaft of the impact wrench. The torque shaft is axially positioned within the second members by shoulders 21 and 22.

The other end 23 of the torque shaft 16 also has a hex shape which is to be inserted in one end of a bolt socket 25. The bolt socket 25 directly transmits the torque to the bolt 5.

In the edge of the open end 14 of the second member 10 there is a slot 26. The slot 26 receives a radial extension 27 which is integral with the torque shaft 16. An axial passage 28 having radial extensions 29 and 29A affords communication between the controller chamber 8 and a side wall of the slot 26.

The regulator 2 comprises a top half 30 and a bottom half 31. The top half 30 has a central recess 32 with an axial cavity 33 extending therefrom.

The bottom half 31 has a recess central 34 which cooperates with the recess 32 in the top half 30 to form a regulator chamber 35. There are two radial openings 36 and 37 extending from the chamber 35. A central opening 38 extends from the bottom half cavity 34 to communicate with a second cavity 39. The cavity 39 communicates with the outer surface of the regulator by a radially extending passage 40. A connection 41 connects the passage 40 with a source of compressed air. A restricted fixed orifice 42 interconnects the passage 40 with the chamber 35.

Extending downwardly from cavity 39 is a passage 43 which opens into a valve chamber 44. There is a valve seat 45 on the end of the valve chamber adjacent to the passage 43. An outlet 46 provides communication from the valve chamber to the atmosphere. This outlet 46 is suitably connected to the torsion device being used.

A diaphragm or flexible wall 47 is positioned within the chamber 35. Extending downwardly from the diaphragm and connected thereto is a valve shaft 48. The valve shaft 48 extends into the valve chamber 44 and has a valve member 49 on the end thereof. The valve member 49 is adapted to nest upon the valve seat 45. A bushing 50 is inserted within the opening 38 to provide a sliding bearing surface for the valve shaft 48.

Seated within the top half cavity 33 is a spring 51 which bears against the top surface of the flexible wall 47. The upper end of the spring 51 is connected to a screw stem 52 which projects outwardly of the regulator. The screw stem provides a means for adjusting the tension of the spring 51.

A pressure gage 53 is connected to the regulator and communicates with the chamber 35 through the opening 37. The pressure gage may be directly calibrated in units of torque measurements such as foot-pounds so as to provide a direct reading of the torque as indicated by the torque controller of this invention.

A flexible conduit 54 connects the chamber 35 of the regulator with the controller chamber 8. If desired, the controller and regulator may be made as one unit or may be rigidly connected together.

Figure 3 is illustrative of a modification of the regulator shown in Figure 1. The regulator in Figure 3 is similar in all respects to the regulator in Figure 1 except that structure is provided for utilizing the regulator directly as a manual admission valve. This is done by replacing the screwstem with a reciprocating plunger 55 which has one end connected to the flexible wall 47 and the other end to a manually operable pivoted lever 56. A spring 57 is interposed between the diaphragm 47 and the surface of the bottom half recess 34.

With this modification, the torque exerted by the torque controller will then be proportional to the pressure exerted by the operator on the hand lever and may be directly read on the indicating gage.

The operation of a torque control device as illustrated in Figure 1 is as follows:

The torque control attachment is interposed between the torsion device and the bolt to be tightened and the torque is passed directly to the torque shaft of the controller. The air pressure is supplied through the passage 40 into the regulator and passes through the open valve to the outlet 46 to the torsion device. Air also bleeds through the fixed restriction 42 in the regulator or modulating valve under the diaphragm and from there into the controller and escapes through the pre-determined gap between the slot 26 of the inner sleeve and the torque shaft lateral extension 27. The pressure on the control spring of the regulator and the relative sizes of the fixed and variable orifices are so chosen that a balance exists between air pressure and spring pressure at the opening position of the control valve of the regulator.

As torque is built up on the fastening, the torque shaft will twist and wind up lightly whereby there will be a cumulative, angular displacement between both ends of the shaft. The sleeve, being fastened at one end only, will not participate in this displacement. Therefore, there will be a relative movement between both, proportional to the torque exerted. This relative movement will narrow the gap between the sleeve slot and the radial shaft extension, thus causing a modulation in air flow which, in turn, will upset the balance between diaphragm pressure and the spring load and cause a movement of the diaphragm in the direction to close the control valve 49. Finally, a new balance will be established between torsional displacement of the torque controller shaft and the control valve position which depends upon the initial adjustment of the spring. The torque exerted by the wrench will be a function of this displacement and will be automatically maintained if the supplied air pressure is reasonably constant. This torque is proportional to the air pressure existing below the diaphragm and may be indicated by a pressure gage directly calibrated in foot-pounds of torque. The torque may readily be changed or adjusted by adjusting the spring tension on the regulating valve. For very exacting requirements, a regulating device may be installed ahead of the regulator to keep the intake pressure constant.

This disclosure has been described in connection with a torque-responsive control for an impact wrench. The torque control device of this invention, however, is not restricted to this use, but may be used with any type of torsion device to indicate and-or control the magnitude of the torque.

It will be understood that this invention is susceptible to modification in order to adapt it to different usages and conditions, and, accordingly, it is desired to comprehend such modifications within this invention as may fall within the scope of the appended claims.

What is claimed is:

1. In a torque control device, a first member, a sleeve being rotatably supported within said first member and forming a controller chamber therewith, a torsion member having one end secured to a corresponding end of said sleeve and the other end thereof being free, said torsion member having means at each end thereof whereby said torsion member is adapted to transmit torque from a torsion device to an object, means on the free end of said torsion member responsive to the angular displacement between the ends of said member, a regulator having a chamber, means for supplying fluid under pressure to said chamber and to the torque device, means defining a passage from said regulator chamber through said controller chamber and exiting at the free end of said sleeve, said displacement responsive means being positioned at the exit of said passage whereby variations in angular displacement will vary the fluid flow through said passage, and means responsive to the pressure in said regulator chamber as varied by said variations in air flow through said passage to stop the flow of fluid under pressure to said torsion device when the fluid flow at the exit of said passage is such so as to correspond to a predetermined torque.

2. In a torque control device, a regulator having a chamber and an outlet opening, said chamber having a flexible wall, said regulator connected to a source of fluid pressure, means for supplying a portion of said fluid under pressure to said chamber, means for conveying the remainder of said fluid under pressure to said regulator outlet, a torsion device connected to said regulator outlet opening, a member for transmitting torque from said torsion device to an object, means responsive to the angular displacement of said member to said torque for varying the pressure in said chamber in response to said angular displacement wherein said chamber pressure will be a function of the torque exerted by said torsion device, and a valve in said outlet connected to said flexible wall wherein said valve is urged to the closed position in response to pressure increase in said chamber to regulate the flow of fluid under pressure to said torsion device.

3. In a torque control device as claimed in claim 2 and further comprising manually operable means connected to said flexible wall to throttle the flow of fluid under pressure through said outlet opening to said torsion device so as to regulate the torque exerted by said torsion device.

4. In a torque control device, a regulator having a chamber and an outlet opening, said regulator being connected to a source of fluid pressure, means for supplying a portion of said fluid under pressure to said chamber, means for conveying the remainder of said fluid under pressure to said regulator outlet, said outlet being connected to a torsion device to supply said device with fluid under pressure, a member for transmitting torque from the torsion device to an object, means responsive to the angular displacement of said member from said torque, means connecting said chamber with said displacement responsive means for varying the pressure in said chamber in response to said displacement wherein said chamber pressure will indicate the torque exerted by said torsion device, and means for regulating the output of said fluid from said regulator outlet in response to the pressure in said chamber to regulate the torque delivered by said torsion device.

5. In a torque control device, a regulator having a chamber, means for supplying fluid under pressure to said chamber, a member for transmitting torque from a torsion device to an object, means responsive to the angular displacement of said member as a result of said torque, means defining a passage for fluid under pressure from said chamber to said angular displacement responsive means for varying the pressure in said chamber in response to the angular displacement of said member, and means operable by the pressure in said chamber as determined by said angular displacement to regulate the torque exerted by said torsion device.

6. In a torque control device, a first member having an annular shape, a second member being rotatably supported within said first member and forming a controller chamber therewith, there being a slot in one end of said second member, there being a passage in said second member leading from said first chamber to said slot, a torsion member having one end secured to the end of said second member opposite said slotted end, said torsion member having coupling means at each end thereof whereby said torsion member is adapted to transmit torque from a torsion device to an object, a regulator having a chamber and an outlet connected to the torsion device, means for supplying fluid under pressure to said chamber, means for supplying a portion of said fluid under pressure to said outlet, means defining a passage from said regulator chamber to said controller chamber, a radial extension on said torsion member projecting into said slot whereby variations in displacement will vary the flow of fluid through said passages, and means for regulating the flow of fluid under pressure from said outlet in response to the pressure in said chamber as varied by said variations in fluid flow through said passages to stop said torsion device when a predetermined torque is exceeded.

References Cited in the file of this patent

UNITED STATES PATENTS

| | | |
|---|---|---|
| 1,970,179 | Miller | Aug. 14, 1934 |
| 2,049,239 | Wilcox | July 28, 1936 |
| 2,127,855 | Baumgratz | Aug. 23, 1938 |
| 2,491,251 | Chinn | Dec. 13, 1949 |
| 2,635,465 | White | Apr. 21, 1953 |
| 2,729,223 | Rosenberger | Jan. 3, 1956 |
| 2,756,622 | LaBelle | July 31, 1956 |

FOREIGN PATENTS

| | | |
|---|---|---|
| 700,441 | Great Britain | Dec. 2, 1953 |